(12) United States Patent
Ganapathiappan et al.

(10) Patent No.: US 8,283,413 B2
(45) Date of Patent: Oct. 9, 2012

(54) ACID-FUNCTIONALIZED HYDROPHOBIC MONOMER EMULSIONS, LATEXES, AND ASSOCIATED LATEXES

(75) Inventors: Sivapackia Ganapathiappan, Palo Alto, CA (US); Zhang-Lin Zhou, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1213 days.

(21) Appl. No.: 11/700,633

(22) Filed: Jan. 30, 2007

(65) Prior Publication Data

US 2008/0182934 A1     Jul. 31, 2008

(51) Int. Cl.
*C08L 33/02* (2006.01)
*C08G 18/62* (2006.01)
*C08F 2/16* (2006.01)
*C08F 2/22* (2006.01)

(52) U.S. Cl. ......... 524/833; 524/800; 524/804; 524/832
(58) Field of Classification Search .................. 524/800, 524/804, 812, 816, 817, 827, 831, 832, 833
See application file for complete search history.

(56) References Cited

U.S. PATENT DOCUMENTS

| | | | | |
|---|---|---|---|---|
| 3,344,127 | A | * | 9/1967 | Masson .......................... 526/304 |
| 6,372,820 | B1 | | 4/2002 | Devonport |
| 7,078,464 | B2 | | 7/2006 | Schmidhauser et al. |
| 2004/0157957 | A1 | * | 8/2004 | Ganapathiappan et al. .. 523/160 |
| 2006/0030662 | A1 | * | 2/2006 | Yang et al. ..................... 524/558 |

OTHER PUBLICATIONS

Textbook of Polymer Science; Billmeyer; $3^{rd}$ Edition; 1984.*

* cited by examiner

*Primary Examiner* — Karuna P Reddy

(57) ABSTRACT

The present invention is drawn to an aqueous emulsion composition. The composition includes an aqueous phase and a hydrophobic phase dispersed in the aqueous phase, which includes a plurality of hydrophobic monomers. The monomers are acid-functionalized and hydrophobic, with less than 10% solubility in water. In one aspect, the monomers can be aromatic. Such monomers can be polymerized with other monomers to form latex particulates. A latex can include latex particulates dispersed in an aqueous fluid medium. In one embodiment, latex particulates can include from about 0.1 wt % to about 25 wt % of polymerized hydrophobic acid-functionalized monomer, and at least one other polymerized film-forming monomer. The latex can be formulated as an ink-jet ink.

5 Claims, No Drawings

ACID-FUNCTIONALIZED HYDROPHOBIC MONOMER EMULSIONS, LATEXES, AND ASSOCIATED LATEXES

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. While latex particulates have applications in these and other fields, the ink-jet ink imaging application can be used to favorably illustrate unique advantages of the invention. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being said, while latex particulates can improve durability of prints, they often exhibit undesirable qualities while in suspension. Latex particulates tend to settle out of and/or agglomerate in suspensions, over time and, therefore, often are not stable in many storage conditions. This being the case, there is a continuing need to provide latex particulates, and the monomers that can be used in forming such improved latex particulates, that provide improved stability and dispersibility.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on an acid-functionalized hydrophobic monomer, a latex particulate, a latex suspension, an ink-jet ink, or a method of preparing the latex particulates, such discussion in one area is applicable to the other areas.

It is noted that, as used in this specification and the appended claims, the singular forms "a," "an," and "the" include plural referents unless the context clearly dictates otherwise.

The term "acid-functionalized" can refer to groups that are acidic and/or generate acidic groups in solution. For example, in addition to acid-functionalized groups that included exposed acid on the surface of a latex particulate or a monomer used to form a latex particulate, a cyano group can generate acidic groups in solution and is therefore included in the definition "acid-functionalized". Blocked-acid or capped-acid monomers that must be reacted or exposed to light or other energy to become "uncapped" are excluded from this definition.

The term "hydrophobic acid-functionalized monomer" refers to monomers that are acid-functionalized, and even with the acid functional group, they are still hydrophobic, e.g., less than 10% soluble in water, and often, less than 7% or even less than 4% soluble in water.

"Solubility in water" or "soluble in water" indicates a percentage value of the total weight of monomer that is soluble. As measurement is difficult for an individual monomer molecule, the solubility percentage can be based on a certain amount of the monomer. Therefore, measurement is based on placing a certain amount of monomer, e.g. a certain weight such as 10 g, in room temperature water such that there is a healthy excess of water (not near saturation levels). The water can be stirred for a time and filtered. The filtrate can be compared to the initial amount to determine the solubility.

As used herein, the term "film-forming monomer" is used primarily for ease in explanation and distinction between the hydrophobic acid-functionalized monomers and other monomers that can be polymerized therewith to form latex particulates. That said, the film-forming monomers can have film-forming qualities when printed onto a substrate, and thus improve the durability of a printed image.

The term "plurality" indicates more than one. Plurality can be used to indicate as few as two to a much larger number.

As used herein, "liquid vehicle" refers to the fluid in which latex particulates and/or colorant can be dispersed or solvated in accordance with embodiments of the present invention. Liquid vehicles are well known in the art, and a wide variety of liquid vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion (with or without the latex is considered to be an ink). In either of these embodiments, whether or not a latex is present in the ink, a latex dispersion can be used as an overcoat for the ink.

The term "colorant" can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a milled or unmodified pigment that utilizes a dispersant (which can be a polymer or an oligomer or a surfactant) in the liquid vehicle to aid the pigment in remaining dispersed therein.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With these definitions in mind, it has been recognized that it would be advantageous to develop aqueous emulsions, latexes, latex particulates, and monomers that can be used to form such latex particulates, which can provide improved durability and dispersion qualities. Latex polymer synthesis typically includes the use of hydrophobic monomers. Among other things, the hydrophobic monomers can provide the resulting latex particulate with the ability to form films when printed on a substrate which can impart image protection and resistance to water. Unfortunately, latex particulates made with hydrophobic monomers tend to agglomerate in solution, thus causing problems with printing architecture, and can also settle out of solution. One component that can be used in the formation of latex particulates is polymerizable acid monomers. Such polymerizable acid monomers can add stability to a latex particulate in dispersions. However, most of the acid monomers such as acrylic acid and methacrylic acid are almost soluble in water and the incorporation of these monomers into the latex particulate can cause unwanted latex properties. For example, some of these acidic monomers can partition into the aqueous phase and can adversely affect the system, which can also indirectly increase the viscosity of the resultant latex dispersion. Viscosity can be a very important quality for many dispersion applications. For example, viscosity has to be fairly low for certain ink-jet printing architectures, in particular, thermal ink-jet architecture. Therefore, it is undesirable for acid monomers to partition into the aqueous phase.

As such, the present invention is drawn to an aqueous emulsion composition including an aqueous phase and a hydrophobic phase dispersed in the aqueous phase. The hydrophobic phase can include a plurality of hydrophobic monomers. The hydrophobic monomers can include at least one monomer type that is modified with an acid-functional group to form a hydrophobic acid-functionalized monomer that is less than 10% soluble in water. Other hydrophobic monomers and/or other monomers can also be present. Further, a latex can include an aqueous fluid medium and a plurality of latex particulates dispersed in the aqueous fluid medium. The latex particulates can include from about 0.1 wt % to about 25 wt % of polymerized hydrophobic acid-functionalized monomer that is less than 10% soluble in water. The latex particulate can further include at least one other polymerized film-forming monomer. Such latex can be configured as an ink-jet ink suspension which includes the latex, colorant, and liquid vehicle.

In accordance with these problems, various details are provided herein which are applicable to each of the monomer, latex particulate, emulsion composition, latex, ink-jet ink, etc. Thus, discussion of one specific embodiment is related to and provides support for this discussion in the context of the other related embodiments.

The hydrophobic acid-functionalized monomers provided herein can be used to form a novel stable latex particulate system, which can be useful for making latex dispersions and/or ink-jet ink formulations. The latex particle system can be made from hydrophobic acid-functionalized monomers. Such monomers can be polymerized in the organic phase to such a degree of polymerization that almost nothing bleeds out or substantially remains in the aqueous phase polymerization. Therefore, the acidic monomers can be effectively polymerized with controlled composition to form latex particulates with improved stability and dispersion, as well as to form latex suspensions with desirable viscosities for thermal ink-jet applications.

Monomers that can be used to create latex particulates with improved dispersion and stability are hydrophobic monomers that are acid-functionalized, and where the hydrophobic acid-functionalized monomers are less than 10% soluble in water (even with the acid incorporated thereon). The acid functionality of the monomer can increase the dispersion properties of a latex particulate which incorporates the polymerized monomer. It is noted that in one embodiment, the hydrophobic acid-functionalized monomer can be less than about 7% soluble in water. In a further embodiment, the hydrophobic acid-functionalized monomer can be less than about 4% soluble in water.

Although various monomer structures are contemplated in accordance with embodiments of the present invention, in one embodiment, the hydrophobic monomer can be aromatic. For example, acrylamidobenzoic acid can be a hydrophobic monomer. This monomer can be effectively created by treating p-Aminobenzoic acid with acryloyl chloride, and readily polymerizes in the organic phase of an emulsion polymerization system. If included, the acrylamidobenzoic acid monomer can be present greater than 10 wt % to about 25 wt %. Further, the monomer can alternatively be present from about 15 wt % to about 25 wt %. In another embodiment, the hydrophobic monomer can be 2-(benzyloxycarbonylmethyl) acrylic acid. Such monomer can be prepared by reacting itaconic anhydride with alcohols, such as benzyl alcohol.

Hydrophobic monomers of the present invention can be poly-acid-functionalized. For example, the hydrophobic monomer can be di-acid-functionalized. Alternatively, the hydrophobic monomers can be mono-acid-functionalized.

In one aspect, the hydrophobic monomer can be acid-functionalized styrene. In one embodiment, this acid-functionalized styrene can be present from about 0.1 wt % to about 25 wt %, or alternatively from about 1 wt % to about 10 wt %. A wide variety of acid-functionalized styrenes can be synthesized through transition metal-catalyzed coupling reactions with vinyl acid or its esters with functionalized aromatic halides. Such synthesis reaction is exemplified in the following reaction:

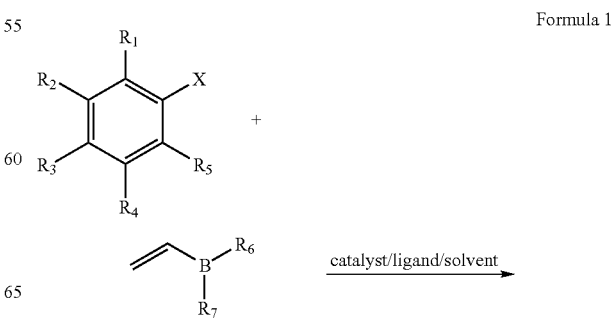

Formula 1

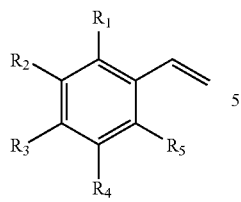

In Formula 1 above, $R_1$, $R_2$, $R_3$, $R_4$ and $R_5$ are independently H, hydroxyl, lower alkyl ($C_1$-$C_6$), lower alkoxy group ($C_1$-$C_6$ alkoxy group), unsubstituted amine, lower alkyl substituted amine, electron-withdrawing group, carboxylic acid, thiocarboxylic acid, amide, carbonyl, sulfonic acid, phosphoric acid, cyano, trifluromethyl groups etc., or fused ring systems with the phenyl rings, with the proviso that at least one of the $R_1$, $R_2$, $R_3$, $R_4$ or $R_5$, is an acid functional group. Likewise, $R_6$ and $R_7$ are independently H, OH, or an organic substituent such as lower alkyl group. The term "catalyst" represents any transition metal catalyst such as Pd, Pt, Ir compounds, etc., or mixtures thereof. The term "ligand" represents any ligand that can form a complex with the above transition metal such as $Ph_3P$, DBA, etc. The solvent can be any solvent that can dissolve the above two reaction materials such as tetrahydrofuran, toluene, acetonitrile, etc.

Examples of acid-functionalized styrenes include mono-acid-functionalized styrene derivatives, such as the following structures:

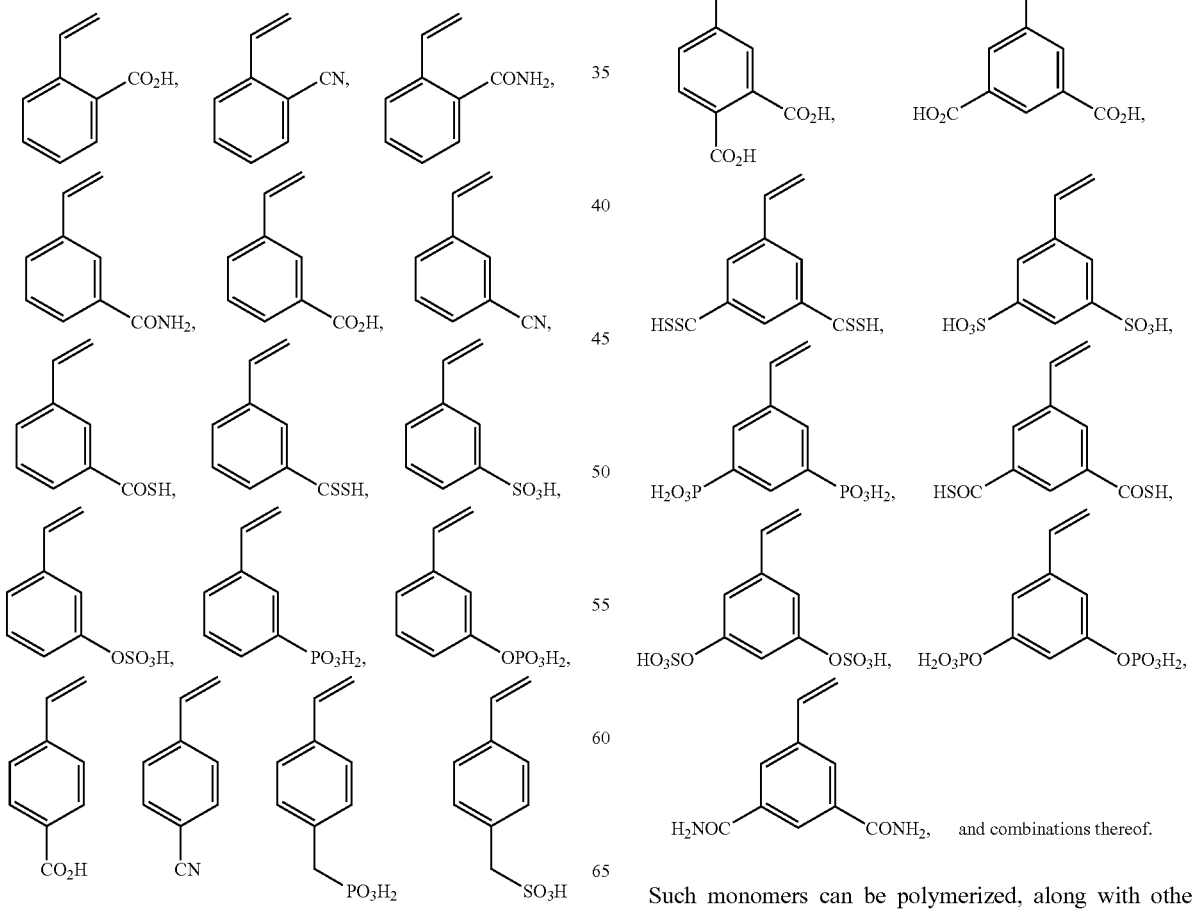

Further, hydrophobic monomers of the type contemplated in the present invention can include di-acid-functionalized styrene derivatives. Non-limiting examples of di-acid-functionalized styrene derivatives include the following structures:

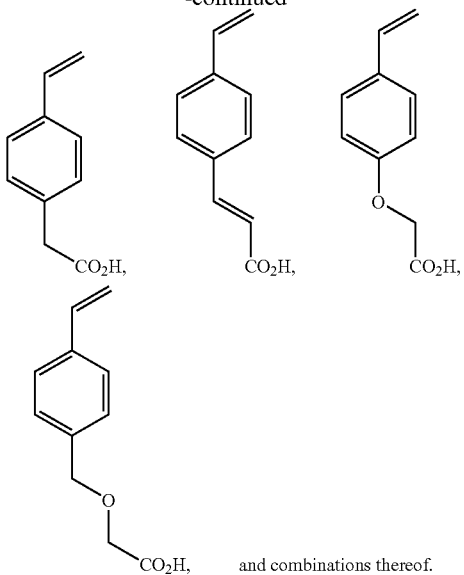

Such monomers can be polymerized, along with other monomers, to create a latex particulate. In accordance with embodiments of the present invention, latex particulates can be generated by emulsion polymerization. One example of polymerization includes the polymerization of from about 0.1 wt % to about 20 wt % of hydrophobic acid-functionalized monomer (based on the total weight of monomers) and at least one other film-forming monomer. In one embodiment, the hydrophobic acid-functionalized monomer can be present in an amount from about 5 wt % to about 10 wt %, by monomer weight. Polymerization techniques, such as emulsion processes, are well know in the art and can be used to polymerize the monomers described herein.

The film-forming monomer can be any monomer capable of polymerizing with the hydrophobic acid-functionalized monomer. Film-forming monomers can be primarily hydrophobic in nature. In one embodiment, the film-forming monomer can comprise or consist essentially of an acrylate, a methacrylate, or other vinyl containing monomers such as styrene. Non-limiting examples of film-forming monomers include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate, styrene, and mixtures thereof.

In one embodiment, less than about 10 wt % of hydrophilic monomer can be polymerized to form the latex. As with the hydrophobic acid-functionalized monomers, hydrophilic monomers, when polymerized to form latex particulates can improve the stability of the latex particulates. The polymerized hydrophobic acid-functionalized monomers are particularly useful at preventing agglomeration as their charge acts to repel, to some degree, latex particulates from other latex particulates.

A latex suspension can also be created using the latex particulates which include polymerized hydrophobic acid-functionalized monomers. The latex particulates can be dispersed in a fluid medium to create a latex suspension. Therefore, a latex suspension can include a fluid medium and latex particulates that include polymerized hydrophobic acid-functionalized monomers. One specialized type of a latex suspension is an ink. Particularly, an ink-jet ink can include a liquid vehicle, a colorant, and latex particulates. The latex particulates can be present in the ink formulation in an amount of about 1 wt % to about 50 wt %. In one specific embodiment, the latex particulates can be present in the ink formulation from about 2 wt % to about 20 wt %. In another embodiment, the colorant comprises or consists essentially of dye. In still another embodiment, the colorant comprises or consists essentially of pigment. Such an ink-jet ink can be printed from ink-jet architecture, and even from more demanding thermal ink-jet architecture.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

The water-soluble organic solvents and/or co-solvents that can be used in the present invention include, but are not limited to, dimethylformamide, dimethylacetamide, acetone, tetrahydrofuran, dioxane, polyethylene glycol, polypropylene glycol, ethylene glycol, propylene glycol, butylene glycol, 1,2-hexanediol, triethylene glycol, 1,2,6-hexanetriol, thiodiglycol, hexylene glycol, diethylene glycol, ethylene glycol methyl ether, diethylene glycol monomethyl ether, triethylene glycol monomethyl ether, ethanol isopropyl alcohol, n-butyl alcohol, isobutyl alcohol, glycerol, n-methyl-2-pyrrolidone, 1,3-dimethylimidazolidinone, triethanolamine, sulfolane, dimethyl sulfoxide, and the like, as well as other amines, ketones, ethers, polyalkylene glycols, alkylene glycols, lower alkyl ethers of polyhydric alcohols, monohydric alcohols, and combinations thereof.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of surfactant, antioxidants, and evaporation accelerators. Examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof. Fluorosurfactants can also be used such as those previously known in the art.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R. T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, other latex particulates, UV curable materials, plasticizers, pigments (other than the colorant), etc.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Synthesis of Polymerizable Benzoic Acid Derivative p-Aminobenzoic acid (35.1 g) is mixed with dichloromethane (200 ml) and triethylamine (35.6 ml). The mixture is stirred well and cooled with ice under nitrogen atmosphere. Then acryloyl chloride (20.8 ml) is added dropwise. It is then stirred at ambient temperature overnight. The resultant composition is then poured into water (1 L) to precipitate the monomer. It is then washed with water and dried to obtain the acrylamidobenzoic acid.

Example 2

Synthesis of Latex with Acrylamidobenzoic Acid Monomer

Methyl methacrylate (6 g), hexyl acrylate (26 g), ethylene glycol dimethacrylate (0.4 g), acrylamidobenzoic acid (8 g), and isooctylmercaptopropionate (0.8 g) are emulsified in water (15 ml) using the surfactant AOT 100% (0.8 g). Meanwhile water (120 ml) is heated to 90° C. Then, the initiator potassium persulfate (0.2 g) is added to the hot water followed by the emulsion over a period of 8 min. The reaction is maintained at 90° C. for another 2 hours and cooled to ambient temperature. The composition is then neutralized with 17.5% potassium hydroxide solution to obtain a latex with about 180 nm average latex particulate size.

Example 3

Synthesis of 2-(benzyloxycarbonylmethyl)acrylic acid

To a solution of itaconic anhydride (33.6 g, 0.3 mol) in 100 ml of toluene is added benzyl alcohol (32.4 g, 0.3 mol). The resulting solution is heated to reflux for 3 hours. After cooling down to room temperature, hexanes (100 mL) are added to the above mixture and are continued to stir for 8 hours. A white solid is collected by filtration and washed with hexanes and dried in vacuum, giving rise to 55 g (83% yield) of the desired product: 2-(benzyloxycarbonylmethyl)acrylic acid monomer.

Example 4

Synthesis of Latex with carboxyphenyloxymethylstyrene

An emulsion is prepared using the monomers styrene (60 g), hexyl methacrylate (29 g), carboxyphenyloxymethylstyrene (10 g), and divinylbenzene (1 g) in water (34 ml) containing 30% Rhodafac (8.33 g). Meanwhile water (290 ml) is heated in a reactor to 90° C. A solution of potassium persulfate (0.348 g) in water (40 ml) is also prepared. This initiator solution and the emulsion were added to the hot water over a period of 22 minutes and 20 minutes, respectively. The reaction mixture is then heated further at 90° C. for 6 hours. Then, the reaction mixture is cooled to obtain a latex. Optionally, this latex can be neutralized with potassium hydroxide solution to raise the pH of the solution to 8.5 prior to inclusion in an ink formulation.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex, comprising:
    a) an aqueous fluid medium; and
    b) a plurality of latex particulates dispersed in the aqueous fluid medium, said latex particulates including:
        i) from about 0.1 wt % to about 25 wt % of a polymerized hydrophobic acid-functionalized monomer which is less than 10% soluble in water, wherein the polymerized hydrophobic acid-functionalized monomer includes 2-(benzyloxycarbonylmethyl)acrylic acid, and
        ii) at least one other polymerized film-forming monomer.

2. The latex of claim 1, wherein the latex particulates include a second polymerized hydrophobic monomer.

3. The latex of claim 1, wherein the polymerized film-forming monomer is selected from the group consisting of methyl methacrylate, hexyl methacrylate, butyl acrylate, hexyl acrylate, ethylhexyl methacrylate, and octyl methacrylate.

4. An ink-jet ink, comprising the latex of claim 1, colorant, and wherein at least a portion of the aqueous fluid medium is formulated as a liquid vehicle.

5. The latex of claim 1, prepared from an aqueous emulsion composition, said aqueous emulsion composition, comprising:
    an aqueous phase; and
    a hydrophobic phase dispersed in the aqueous phase, said hydrophobic phase including a plurality of hydrophobic monomers, wherein at least one of said monomers is a hydrophobic monomer with an acid-functional group and is less than 10% soluble in water, wherein at least one of the hydrophobic monomer with an acid functional group includes 2-(benzyloxycarbonylmethyl) acrylic acid.

* * * * *